United States Patent
Autebert et al.

(10) Patent No.: US 10,639,631 B2
(45) Date of Patent: May 5, 2020

(54) MICROFLUIDIC PROBE HEAD FOR PROCESSING A SEQUENCE OF LIQUID VOLUMES SEPARATED BY SPACERS

(71) Applicant: INTERNATIONAL BUSINESS MACHINES CORPORATION, Armonk, NY (US)

(72) Inventors: Julien Autebert, Kilchberg (CH); Emmanuel Delamarche, Thalwil (CH); Govind Kaigala, Rueschlikon (CH); Xander Frank Van Kooten, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 641 days.

(21) Appl. No.: 15/041,141

(22) Filed: Feb. 11, 2016

(65) Prior Publication Data
US 2016/0243549 A1   Aug. 25, 2016

(30) Foreign Application Priority Data

Feb. 13, 2015   (EP) .................................... 15155054

(51) Int. Cl.
*B01L 3/00*   (2006.01)
*B01L 3/02*   (2006.01)
(Continued)

(52) U.S. Cl.
CPC ....... *B01L 3/502715* (2013.01); *B01L 3/0262* (2013.01); *B01L 3/0293* (2013.01);
(Continued)

(58) Field of Classification Search
CPC ....... B01L 3/502715; B01L 2200/0673; B01L 2200/0621; G01N 2035/1034; G01N 1/28; G01N 35/10
See application file for complete search history.

(56) References Cited

U.S. PATENT DOCUMENTS 8,312,780 B2 †  11/2012  Blacklin
8,365,616 B1 †   2/2013  Wolcott
(Continued)

FOREIGN PATENT DOCUMENTS

CN     103140283 A      6/2013
DE   102010032203 A1    1/2012
(Continued)

OTHER PUBLICATIONS

First Office Action, dated Dec. 27, 2018 for CN Application CN2016800100952, 10 pages.
(Continued)

*Primary Examiner* — Lyle Alexander
*Assistant Examiner* — Bryan Kilpatrick
(74) *Attorney, Agent, or Firm* — Michael A. Petrocelli (57) ABSTRACT

Microfluidic probe head for processing a sequence of separate liquid volumes separated by spacers. The microfluidic probe head includes: an inlet, an outlet, a first fluid channel and a second fluid channel and a fluid bypass connecting the first fluid channel and the second fluid channel. The first fluid channel delivers the sequence of separate liquid volumes from the inlet toward a deposition area, the fluid bypass allows the spacers to be removed from the first fluid channel obtaining a free sequence of separate liquid volumes without spacers, the first fluid channel delivers the free sequence of separate liquid volumes to the deposition area, and the second fluid channel delivers the removed spacers from the fluid bypass to the outlet. The present invention also provides a microfluidic probe and method for processing a sequence of separate liquid volumes.

17 Claims, 6 Drawing Sheets

(51) Int. Cl.
  *G01N 35/10* (2006.01)
  *G01N 35/00* (2006.01)
  *G01N 1/28* (2006.01)

(52) U.S. Cl.
  CPC ... *B01L 3/502769* (2013.01); *B01L 3/502784* (2013.01); *G01N 35/00871* (2013.01); *G01N 35/10* (2013.01); *B01L 2200/027* (2013.01); *B01L 2200/0636* (2013.01); *B01L 2200/0673* (2013.01); *B01L 2300/089* (2013.01); *B01L 2300/0848* (2013.01); *B01L 2300/0861* (2013.01); *B01L 2400/0487* (2013.01); *B01L 2400/086* (2013.01); *G01N 1/28* (2013.01); *G01N 2035/1034* (2013.01)

(56) References Cited

U.S. PATENT DOCUMENTS

| | | | |
|---|---|---|---|
| 8,889,083 | B2 | 11/2014 | Ismagilov et al. |
| 2003/0159999 | A1* | 8/2003 | Oakey ............ B01D 57/02 210/695 |
| 2007/0039866 | A1 | 2/2007 | Schroeder |
| 2010/0252118 | A1* | 10/2010 | Fraden ............ B01L 3/502746 137/2 |
| 2013/0183210 | A1 | 7/2013 | Wiyatno et al. |
| 2013/0333761 | A1* | 12/2013 | Delamarche ...... B01L 3/502707 137/1 |
| 2014/0038167 | A1 | 2/2014 | Linder et al. |

FOREIGN PATENT DOCUMENTS

| | | |
|---|---|---|
| WO | 2011/067670 A2 | 6/2011 |
| WO | 2012056269 A1 | 5/2012 |
| WO | 2012056369 A1 | 5/2012 |
| WO | 2013183013 A1 | 12/2013 |

OTHER PUBLICATIONS

International Search Report and Written Opinion, International Application No. PCT/EP2016/052995, International Filing Date Feb. 12, 2016, 9 pages.

Japan International Search Report, dated Oct. 19, 2017 for JP Application JP2017535862, 4 pages.

\* cited by examiner
† cited by third party

MICROFLUIDIC PROBE HEAD FOR PROCESSING A SEQUENCE OF LIQUID VOLUMES SEPARATED BY SPACERS

CROSS-REFERENCE TO RELATED APPLICATION

This application claims priority under 35 U.S.C. § 119 from European Patent Application No. 15155054.8 filed Feb. 13, 2015, the entire contents of which are incorporated herein by reference.

FIELD OF THE INVENTION

The invention relates to a microfluidic probe head. More particularly, a microfluidic probe head for processing a sequence of separate liquid volumes separated by spacers.

BACKGROUND

Microfluidics deals with the behavior, precise control and manipulation of small volumes of fluids that are typically constrained to micrometer-length scale channels and to volumes typically in the sub-milliliter range. Here, fluids refer to liquids and either term may be used interchangeably in the rest of the document. In particular, typical volumes of liquids in microfluidics range from 10-15 L to 10-5 L and are transported via microchannels with a typical diameter of 10-7 m to 10-4 m.

At the microscale, the behavior of the liquids can differ from that at a larger, macroscopic scale. In particular, surface tension, viscous energy dissipation and fluidic resistance are dominant characteristics of the flow. For example, the Reynolds number, which compares an effect of momentum of a fluid to the effect of viscosity, can decrease to such an extent that the flow behavior of the fluid becomes laminar rather than turbulent.

In addition, liquids at the microscale do not necessarily mix in the traditional, chaotic sense due to the absence of turbulence in low-Reynolds number flows and interfacial transport of molecules or small particles between adjacent liquids often takes place through diffusion. As a consequence, certain chemical and physical properties of liquids such as concentration, pH, temperature and shear force are deterministic. This provides more uniform chemical reaction conditions and higher grade products in single and multistep reactions.

A microfluidic probe is a microfabricated scanning device for depositing, retrieving, transporting, delivering, and/or removing liquids, and in particular liquids containing chemical and/or biochemical substances. For example, the microfluidic probe can be used on the fields of diagnostic medicine, pathology, pharmacology and various branches of analytical chemistry. Here, the microfluidic probe can be used for performing molecular biology procedures for enzymatic analysis, deoxyribonucleic acid (DNA) analysis and proteomics.

Many of chemical and biochemical processes require multiple steps that are performed sequentially, involving exposure of a target surface to different liquids including (bio)chemicals, solvents and buffers under various conditions such as different temperatures, different concentrations and/or different durations.

Accordingly, the microfluidic probe should enable the delivery of a sequence of liquids in small volumes to a surface with low or no mixing between the sequential liquids. During transport of the liquids, these sequential sections of liquids inside a capillary or microfluidic channel are often termed as 'plugs'. Typically, in microfluidic capillaries and channels, mixing between subsequent plugs containing different liquids due to (Taylor) dispersion decreases the concentration gradient between these subsequent plugs. In order to deliver a sequence of small-volume plugs to a surface, the microfluidic probe should be capable of rapidly switching between different liquids that form a sequence of small-volume plugs. In the meantime, the dispersion of plugs during the delivery to the surface should be limited in order to prevent subsequent plugs from mixing with one another.

Microfluidic probe heads are know which are suitable for patterning continuous and discontinuous patterns of biomolecules on surfaces and processing resist materials on a surface. However, liquids that are sequentially delivered to the target surface tend to mix with one another due to advective and diffusive effects. As a result, the sequence of plugs delivered to the surface may no longer be identical in terms of solute or particle concentration, viscosity and plug volume by the time it reaches the surface as compared to its initial state shortly after the point where the sequence is generated.

One approach to prevent sequentially delivered liquids from mixing with one another is made by inserting spacers of an immiscible-phase fluid between sequential plugs that have different continuous-phase liquids. For instance, the sequential plugs could be aqueous, while the immiscible-phase spacers are constituted by an oil or a gas. The immiscible-phase spacers prohibit a diffusion of solutes and/or particles between sequential plugs. "The chemistrode: A droplet-based microfluidic device for stimulation and recording with high temporal, spatial, and chemical resolution", D. Chen et al., PNAS, 2008 (105), 16843-16848, discloses a tool that delivers aqueous stimulus plugs separated by segments of an immiscible phase to a target surface and retrieves response plugs. However, the tool and the immiscible-phase spacers come into direct contact with the target surface.

A drawback of many prior art solutions is that they are not applicable to local chemistry performed in wet environments, in particular when willing to use hydrodynamic flow confinement. Therefore, the deposition of droplets cannot be localized due to spreading of the liquid using this device and method.

SUMMARY OF THE INVENTION

A first aspect of the present invention provides a microfluidic probe head for processing a sequence of separate liquid volumes separated by spacers. The microfluidic probe head includes: an inlet, an outlet, a first fluid channel and a second fluid channel and a fluid bypass connecting the first fluid channel and the second fluid channel. The first fluid channel delivers the sequence of separate liquid volumes from the inlet toward a deposition area, the fluid bypass allows the spacers to be removed from the first fluid channel obtaining a free sequence of separate liquid volumes without spacers, the first fluid channel delivers the free sequence of separate liquid volumes to the deposition area, and the second fluid channel delivers the removed spacers from the fluid bypass to the outlet.

A second aspect of the present invention provides a microfluidic probe for processing a sequence of separate liquid volumes separated by spacers. The microfluidic probe includes: a microfluidic probe head including an inlet, an outlet, a first fluid channel, a second fluid channel, and a fluid bypass connecting the first fluid channel and the second fluid channel; a plurality of liquid supplies fluidly connectable to the inlet of the microfluidic probe; and a control unit for selectively fluidly connecting the inlet of the microfluidic probe to one of the plurality of liquid supplies.

A third aspect of the present invention provides a method for processing a sequence of separate liquid volumes separated by spacers. The method includes: delivering via a first fluid channel the sequence of separate liquid volumes from a liquid inlet and toward a deposition area; removing from the first fluid channel the spacers separating the separate liquid volumes from one another via a fluid bypass that connects the first fluid channel and a second fluid channel, thereby obtaining a free sequence of separate liquid volumes without spacers; delivering the free sequence of separate liquid volumes to the deposition area; and delivering the removed spacers from the fluid bypass to an outlet via the second fluid channel.

BRIEF DESCRIPTION OF THE DRAWINGS

Similar or functionally similar elements in the figures have been allocated the same reference signs if not otherwise indicated.

DETAILED DESCRIPTION OF THE PREFERRED EMBODIMENTS

Some preferred embodiments will be described in more detail with reference to the accompanying drawings, in which the preferable embodiments of the present invention have been illustrated. However, the present invention can be implemented in various manners, and thus should not be construed to be limited to the embodiments disclosed herein. On the contrary, those embodiments are provided for the thorough and complete understanding of the present invention, and to completely convey the scope of the present invention to those skilled in the art.

Figure 1:
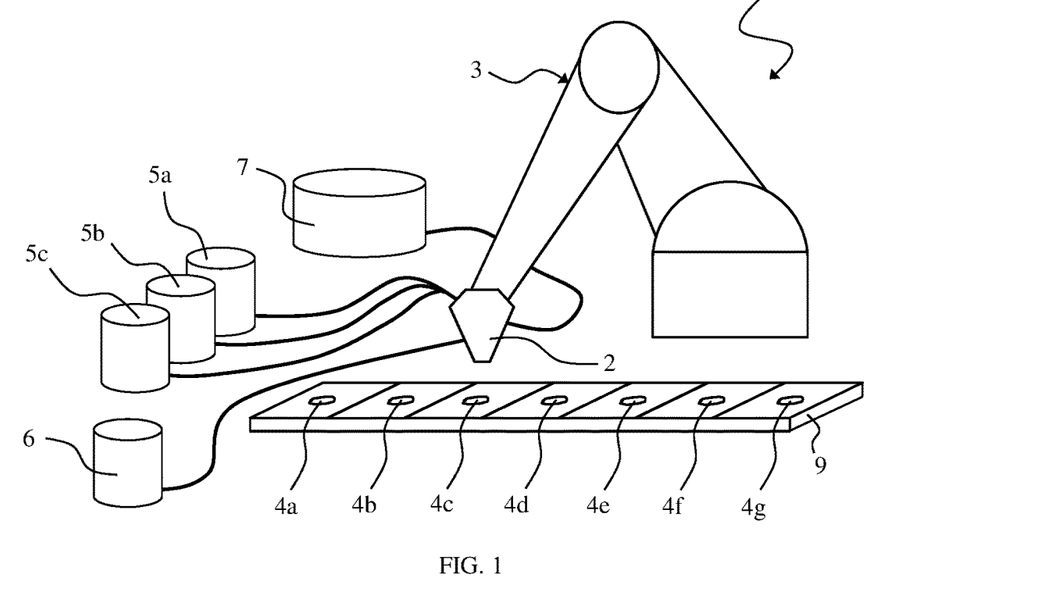
FIG. 1 shows, in a perspective view, a microfluidic probe for performing sequential chemistry using hydrodynamic flow confinement, the microfluidic probe including a microfluidic probe head.

FIG. 1 shows a schematic perspective view of microfluidic probe 1 for performing sequential chemistry using hydrodynamic flow confinement.

Microfluidic probe 1 includes: microfluidic probe head 2 attached to robotic arm 3. Robotic arm 3 is configured for positioning microfluidic probe head 2 at a specific location and above each of deposition areas 4a-4g. Preferably, microfluidic probe 1 further integrates an x, y and z positioning stage in order to perform an arbitrary three-dimensional movement. In particular, microfluidic probe 1 is configured for performing sequential chemistry.

Microfluidic probe head 2 is fluidly connected to liquid supplies 5a-5c, spacer supply 6 and disposal unit 7. Liquid supplies 5a-5c provide microfluidic probe head 2 with different liquids such as liquids that contain biochemical substances. Spacer supply 6 supplies microfluidic probe head 2 with oil. Disposal unit 7 collects waste fluids from microfluidic probe head 2.

Figure 2:
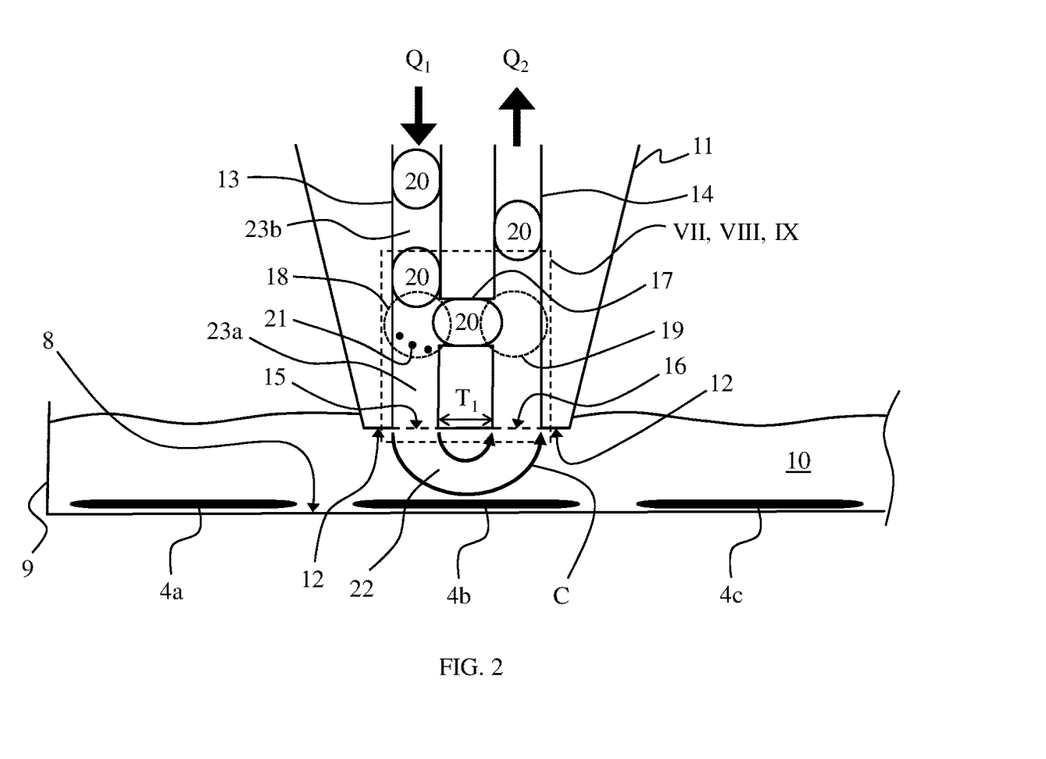
FIG. 2 shows a cross-sectional partial view of a first embodiment of the microfluidic probe head of FIG. 1.

FIG. 2 shows a partial view of a first embodiment of microfluidic probe head 2 illustrating the fluid flows and the formation of hydrodynamic flow confinement.

Generally speaking, hydrodynamic flow confinement (HFC) relates to a phenomenon that a laminar flow of an injection liquid is spatially confined within a liquid bath containing a background liquid. Embodiments of the invention may advantageously rely on hydrodynamic flow confinement, as discussed in detail below. For the sake of illustration, embodiments discussed herein mostly assume hydrodynamic flow confinement. For instance, in the embodiment of FIG. 2, an injection microchannel injects the injection liquid into the liquid bath with an injection flow rate and an aspiration microchannel aspirates the injection liquid and some of the background liquid with an aspiration flow rate. By keeping the aspiration flow rate higher than the injection rate, the laminar flow of the injection liquid from the injection channel to the aspiration channel is formed and confined inside a volume within the surrounding liquid bath.

In the embodiment of FIG. 2, deposition areas 4a-4c are located on top of bottom surface 8 of Petri dish 9 or the like that is at least partly filled with immersion liquid 10 such that deposition areas 4a-4c are covered with immersion liquid 10. For example, deposition areas 4a-4c may include biological and biochemical substances, such as cells or tissue, and/or a device (e.g. a chip) to detect viral and/or bacterial infections or allergies.

Microfluidic probe head 2 includes: body 11 having end face 12. First fluid channel 13 and second fluid channel 14 are formed in body 11. First aperture 15 and second aperture 16 are formed in end face 12. First and second apertures 15, 16 are fluidly connected to first and second fluid channels 13, 14, respectively. For example, distance T1 between first and second apertures 15, 16 is less than 2.0 mm.

Body 11 of microfluidic probe head 2 acts as housing or carrier. All elements, parts and/or devices integrated in body 11 may be manufactured on-chip (using lithography, for example) and are movable therewith.

Fluid bypass 17 is located inside body 11. Fluid bypass 17 is fluidly connected to first fluid channel 13 at first bypass junction 18 and to second fluid channel 14 at second bypass junction 19 so as to connect first fluid channel 13 and second fluid channel 14.

Microfluidic probe head 2 is positioned above deposition area 4b in FIG. 2. End face 12 of microfluidic probe head 2 is spaced from deposition area 4b such that a distance between end face 12 and deposition area 4b is 1-100 μm. At this distance, end face 12 is immersed in immersion fluid 10 covering deposition areas 4a-4c. A sequence of separate liquid volumes, including liquid volumes 23a, 23b, separated by spacers 20 is delivered via first fluid channel 13 to first bypass junction 18, where blocking elements 21 redirect spacers 20 into fluid bypass 17.

If spacers 20, in particular spacers that include an oil-phase, come into contact with deposition area 4a-4c, surface properties of deposition area 4a-4c can be altered and deposition areas 4a-4c can be contaminated and the stability of the hydrodynamic flow confinement can be disrupted, thereby disturbing the deposition of the liquid volumes at required deposition areas 4a-4c. In particular, biochemical substances such as proteins, cells and biological tissues on deposition areas 4a-4c might be denatured and/or damaged by coming in contact with spacers 20. On the other hand, lipophilic analytes such as lipids, therapeutic molecules, hormones, non-polar dyes or tracers may be carried away by spacers 20. Furthermore, if spacers 20 that are discharged through first aperture 15 they may exert a shear stress on objects below and thereby damage and/or shift them.

By removing spacers 20 that separate liquid volumes 23a, 23b of the sequence of liquid volumes from first fluid channel 13, spacers 20 are prevented from reaching deposition areas 4a-4c and a free sequence of separate liquid volumes, that is the sequence of separate liquid volumes with spacers 20 being removed therefrom, is delivered toward first aperture 15. Only confinement volume 22 and, hence, laminar flow C of the free sequence of separate liquid volumes come into contact with deposition area 4a-4c during operation.

The free sequence of separate liquid volumes discharges into immersion liquid 10 through first aperture 15 with first flow rate Q1. At the same time, part of immersion liquid 10 and the free sequence of separate liquid volumes that is discharged into immersion liquid 10 are aspirated through second aperture 16 into second fluid channel 14 with second flow rate Q2. For example, first and second flow rates Q1, Q2 can be generated using corresponding pumps (not shown).

If second flow rate Q2 is higher than first flow rate Q1, and a ratio of second flow rate Q2 to first flow rate Q1 is, for example, 1.2-10, laminar flow C can be obtained from first aperture 15 to second aperture 16. Achieving such a laminar flow allows for hydrodynamic flow confinement. The laminar flow C is hydrodynamically confined by immersion liquid 10 within confinement volume 22 that extends from below first aperture 15 to below second aperture 16. The size of confinement volume 22 and the shape of laminar flow C are defined by first flow rate Q1, second flow rate Q2 and the ratio of second flow rate Q2 to first flow rate Q1, the distance between the first and second apertures and/or the distance between end face 12 and respective target area 4a-4c. For example, the first flow rate Q1 may be chosen to be 1.0 fL/s-1.0 mL/s and the second flow rate Q2 may be chosen to be 0.2 fL/s-4.0 mL/s.

In order to deposit first liquid volume 23a onto deposition area 4b, microfluidic probe head 2 is positioned such that confinement volume 22 is in contact with deposition area 4b. A part of liquid volume 23a and/or substances that are carried in liquid volume 23a may adhere to deposition area 4b and/or react with is substance that is located on top of deposition area 4b. A remaining part of liquid volume 23a moves along with laminar flow C and is aspirated through second aperture 16 into second fluid channel 14.

After the deposition of first liquid volume 23a, microfluidic probe head 2 can be positioned above the next deposition area 4c in order to deposit second liquid volume 23b onto it. The steps of positioning microfluidic probe head 2 above the respective deposition area and depositing a liquid volume onto it can be repeated as many times as required.

Figure 3:
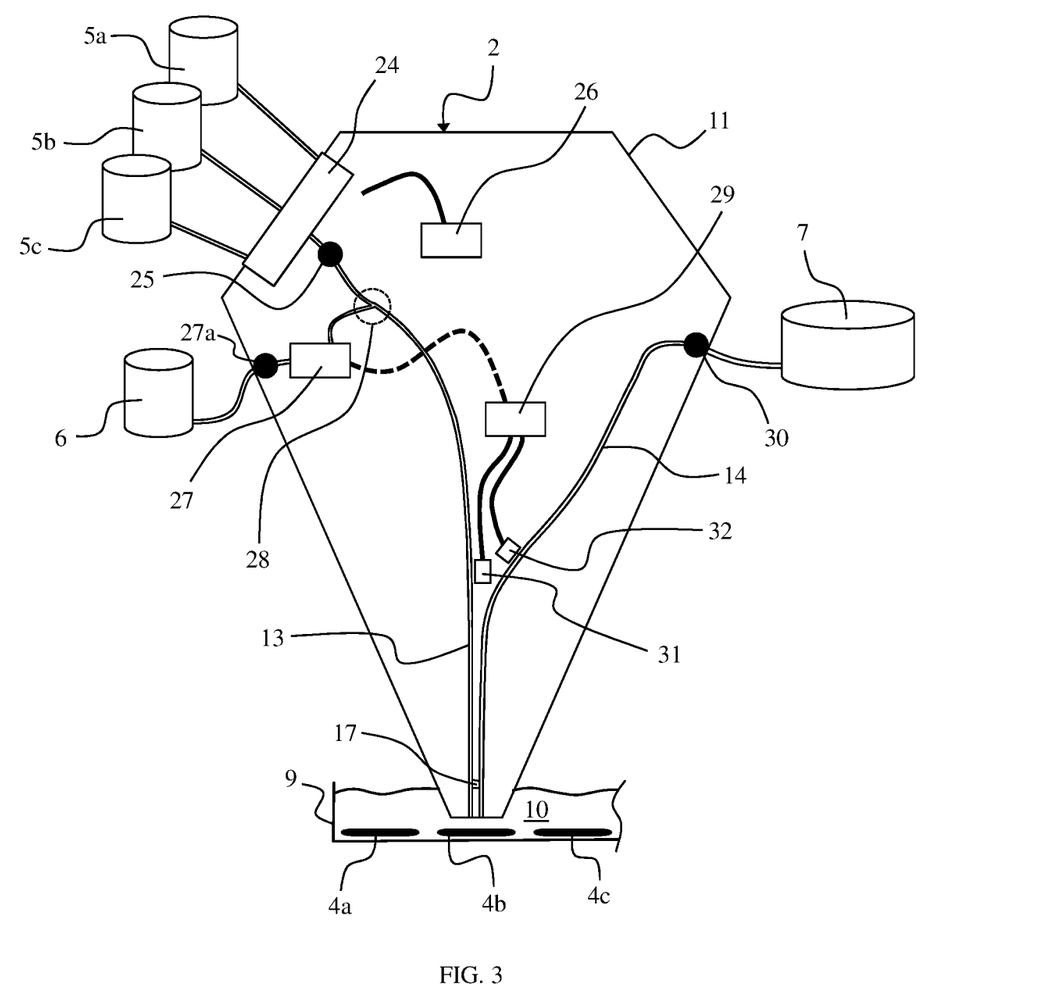
FIG. 3 shows a comprehensive view of the first embodiment of the microfluidic probe head and fluid connections from FIG. 1.

FIG. 3 shows a schematic cross-sectional view of the first embodiment of microfluidic probe head 2 and the fluid connections from FIG. 1.

Liquid supplies 5a-5c are located outside of body 11 of microfluidic probe head 2. Valve device 24 fluidly connects liquid supplies 5a-5c and inlet 25. Liquid supplies 5a-5c contain different liquids. Liquid supplies 5a-5c may contain a single liquid, an emulsion, a suspension and/or other mixtures of same phase or different phases, e.g. solid-liquid, liquid-gas and/or liquid-liquid mixtures. In particular, at least one of liquid supplies 5a-5c may contain a liquid that includes a biochemical substance. In particular, at least one of liquid supplies 5a-5c may contain a liquid that is of use in (bio)chemical analysis and/or can be judged as such by those familiar with the field, e.g. any organic and/or inorganic fluids and/or substances that are related to lifeforms. Accordingly, liquid supplies 5a-5c may supply microfluidic probe head 2 with one or more liquids containing biological substances (e.g. cells, proteins, DNA, drugs, antibodies, chemical stimulants and/or chemical responses). The liquids supplied by liquid supplies 5a-5c may differ, for example, in terms of chemical composition or a concentration of one or more substances contained therein. Liquid supplies 5a-5c feed the liquids to valve device 24.

Valve device 24 is fluidly connected to first fluid channel 13 and is capable of feeding the liquids received from liquid supplies 5a-5c into first fluid channel 13. In particular, valve device 24 is configured for selectively feeding a specific amount of one of the liquids from liquid supplies 5a-5c into first fluid channel 13. Inlet control unit 26 is located inside body 11 of microfluidic probe head 2 and configured for selectively, fluidly connecting inlet 25 to one of liquid supplies 5a-5c by controlling valve device 24. For this purpose, valve device 24 is operable for consecutively and/or alternately feeding liquid volumes from liquid supplies 5a-5c into first fluid channel 13 via inlet 25 thereby forming a free sequence of separate liquid volumes. The volume of each separate liquid volume and the order of the separate liquid volumes can be specified using inlet control unit 26. For example, a fluorescence readout (a corresponding sensor is not shown) from deposition areas 4a-4g may be interpreted to control the time of exposure to a certain chemical. Once the desired time of exposure is reached, liquid supplies 5a-5c are switched using valve device 24.

Alternatively, it is possible that only one liquid supply 5a is fluidly connected to microfluidic probe head 2. In this case, liquid from liquid supply 5a flows into first fluid channel 13 instead of a plurality of different liquids.

Spacer supply 6, located outside of body 11 of microfluidic probe head 2, is fluidly connected to spacer insertion unit 27 via inlet 27a and supplies it with oil that is immiscible with any of the liquids from liquid supplies 5a-5c and immersion liquid 10 and is thereby suitable for providing spacers 20. Instead of oil, other non-polar spacer fluids, such as fats, lipids, hexane and/or toluene that are immiscible with the liquids from liquid supplies 5a-5c and the immersion liquid may be employed. In this way, the separation of the liquid volumes from one another is facilitated due to an interfacial tension between adjacent spacers 20 and liquid volumes.

The free sequence of separate liquid volumes flows along first fluid channel 13 toward spacer junction 28, where spacer insertion unit 27 is fluidly connected to first fluid channel 13. Spacer junction 28 is located between inlet 25 and first bypass junction 18 in first fluid channel 13. Spacer insertion unit 27 is configured for inserting spacers 20 into first fluid channel 13, thereby forming a sequence of separate liquid volumes separated by spacers 20. In particular, the insertion of spacers 20 by spacer insertion unit 27 is timed such that the liquid volumes of the free sequence of separate liquid volumes are separated from one another by spacers 20. In case of one single liquid delivered to spacer junction 28, spacers 20 divide the liquid into separate liquid volumes 23a, 23b. Control unit 29 located inside body 11 of microfluidic probe head 2 controls the insertion of spacers 20 into first fluid channel 13 by spacer insertion unit 27.

After deposition of a liquid volume the remaining part of the liquid volume, retrieved spacers 20 and a part of immersion liquid 10 are delivered to disposal unit 7 via second fluid channel 14. Outlet 30 fluidly connects second fluid channel 14 located inside body 11 of microfluidic probe head 2 to disposal unit 7 outside of it. Disposal unit 7 can be configured for recycling, re-using, storing and/or properly disposing the retrieved liquids. Alternatively or in addition, it is possible that second fluid channel 14 is fluidly connected via outlet 30 to an analyzing device that analyzes the liquid and/or spacers provided at outlet 30.

First detector 31 and second detector 32 are installed in vicinity of first fluid channel 13 and second fluid channel 14, respectively, inside body 11 of microfluidic probe head 2. Both first and second detectors 31,32 are configured for detecting and identifying spacer 20. Upon detection of spacer 20, first and second detectors 31, 32 generate a first detection signal and a second detection signal, respectively, and transmit it to control unit 29. Based on the first and second detection signals control unit 29 may synchronize the insertion rate of spacers 20 into first fluid channel 13 and the aspiration rate at which they are aspirated through second fluid channel 14. To this end, control unit 29 may control insertion unit 29 and/or the aforementioned pumps accordingly.

In particular, first and second detectors 31, 32 can be configured for detecting spacers 20 by optical, electrical and/or magnetic means. Properties of spacers 20 such as hydrophilicity and surface tension can be detected and/or measured by first and second detectors 31, 32.

FIGS. 4A-4L illustrate subsequent operation steps of microfluidic probe head 2 of FIG. 2. Immersion liquid 10 and body 11 of microfluidic probe head 2 are not shown.

In the following, achieving laminar flows allows for hydrodynamic flow confinement.

Figure 4:
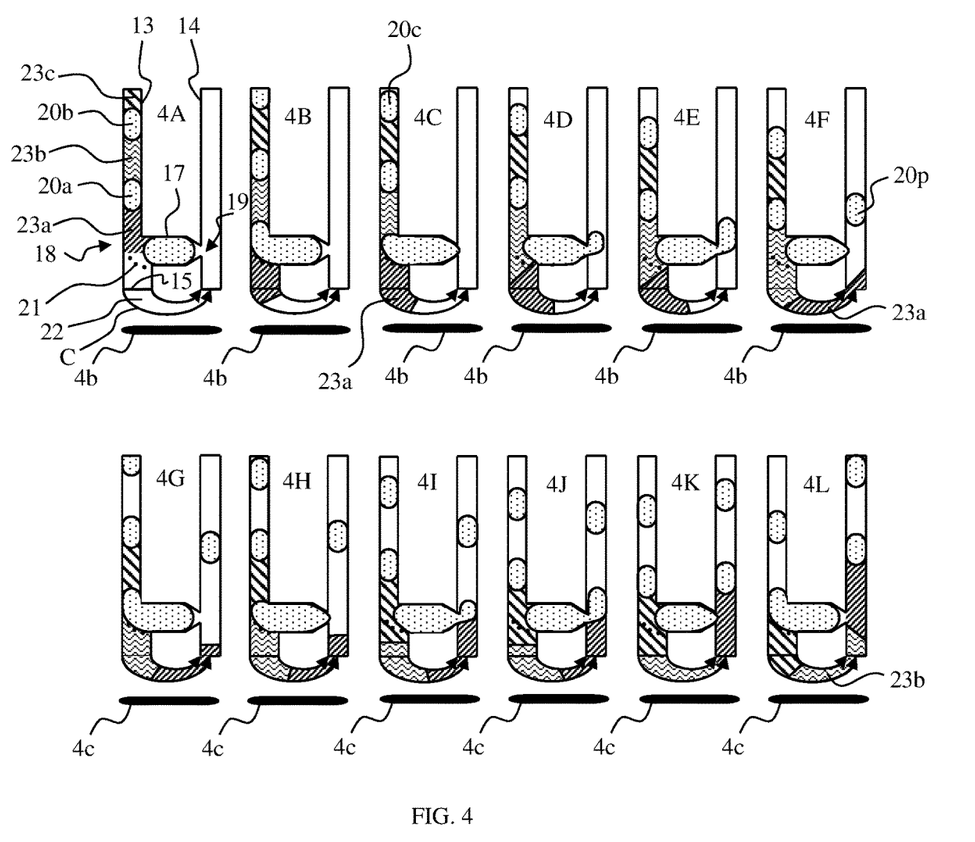
FIG. 4 illustrates subsequent operation steps of the microfluidic probe head from FIG. 2.

In FIG. 4A, sequence of separate liquid volumes 23a-23c separated by spacers 20a, 20b is delivered via first fluid channel 13 to first bypass junction 18. Due to the specific ratio of second flow rate Q2 to first flow rate Q1 as described above, laminar flow C from first aperture 15 to second aperture 16 is formed and confined by immersion liquid 10 within confinement volume 22 that extends from below first aperture 15 to below second aperture 16.

In FIG. 4B, first liquid volume 23a flows past blocking elements 21 and discharges through first aperture 15 into confinement volume 22, where first liquid volume 23a is driven toward second aperture 16 by laminar flow C.

In FIG. 4C, first spacer 20a that separates first liquid volume 23a and second liquid volume 23b from each other flows into fluid bypass 17 rather than passing through narrow sub-channels formed by blocking elements 21.

After first spacer 20a is removed from first fluid channel 13, second liquid volume 23b moves toward preceding first liquid volume 23a and comes into contact with it, as shown in FIGS. 4C and 4D. At the same time, an overpressure is built inside the fluid bypass due to first spacer 20a being added to the volumes of spacer fluid in fluid bypass 17.

The overpressure inside fluid bypass 17 is reduced by releasing spacer 20p from fluid bypass 17 into second fluid channel 14 at bypass junction 19, as illustrated in FIGS. 4D to 4F.

First liquid volume 23a, discharged into confinement volume 22, moves with laminar flow C. Since confinement volume 22 is in a surface contact with deposition area 4b, first liquid volume 23a comes into contact with deposition area 4b, and a part of first liquid volume 23a and/or substances that are carried by the first liquid volume 23a adheres to and/or reacts with deposition area 4a. A remaining part of first liquid volume 23a reaches second aperture 16 and is aspirated into second fluid channel 14, as shown in FIG. 4F.

Following first liquid volume 23a, second liquid volume 23b is discharged through first aperture 15 into confinement volume 22 and flows toward second aperture 16, as shown in FIGS. 4G-4K. In the meantime, microfluidic probe head 2 is positioned above the next deposition area 4c, e.g. by means of robotic arm 3, such that confinement volume 22 is in a surface contact with the next deposition area 4c. During flowing along laminar flow C within confinement volume 22, a part of second liquid volume 23b and/or substances that are carried by second liquid volume 23b adhere to and/or react with the next deposition area 4c. A remaining part of second liquid volume 23b reaches second aperture 16 and is aspirated into second fluid channel 14, as shown in FIG. 4L.

In FIGS. 4G and 4H, second spacer 20b that separates second liquid volume 23b from third liquid volume 23c reaches first bypass junction 18 and flows into fluid bypass 17 rather than passing through the narrow channels formed by blocking elements 21. Third liquid volume 23c moves toward second liquid volume 23b and comes into contact with it. The procedure described so far for both first and second liquid volumes 23a, 23b applies to the third liquid volume 23c in the same manner.

First and second flow rates Q1, Q2 can be synchronized (by way of control unit 29, for example) such that bypassing spacer 23p is inserted from fluid bypass 17 into second fluid channel 14 just when retrieved first liquid volume 23a arrives in second bypass junction 19, as illustrated in FIGS. 4I-4K. The retrieved first liquid volume 23a is thereby separated from the preceding liquid volumes moving along second fluid channel 14 toward outlet 30.

Accordingly, the subsequently retrieved/aspirated first and second liquid volumes 23a, 23b can be separated by properly phasing the insertion of spacers 20 into second fluid channel 14.

Figure 5:
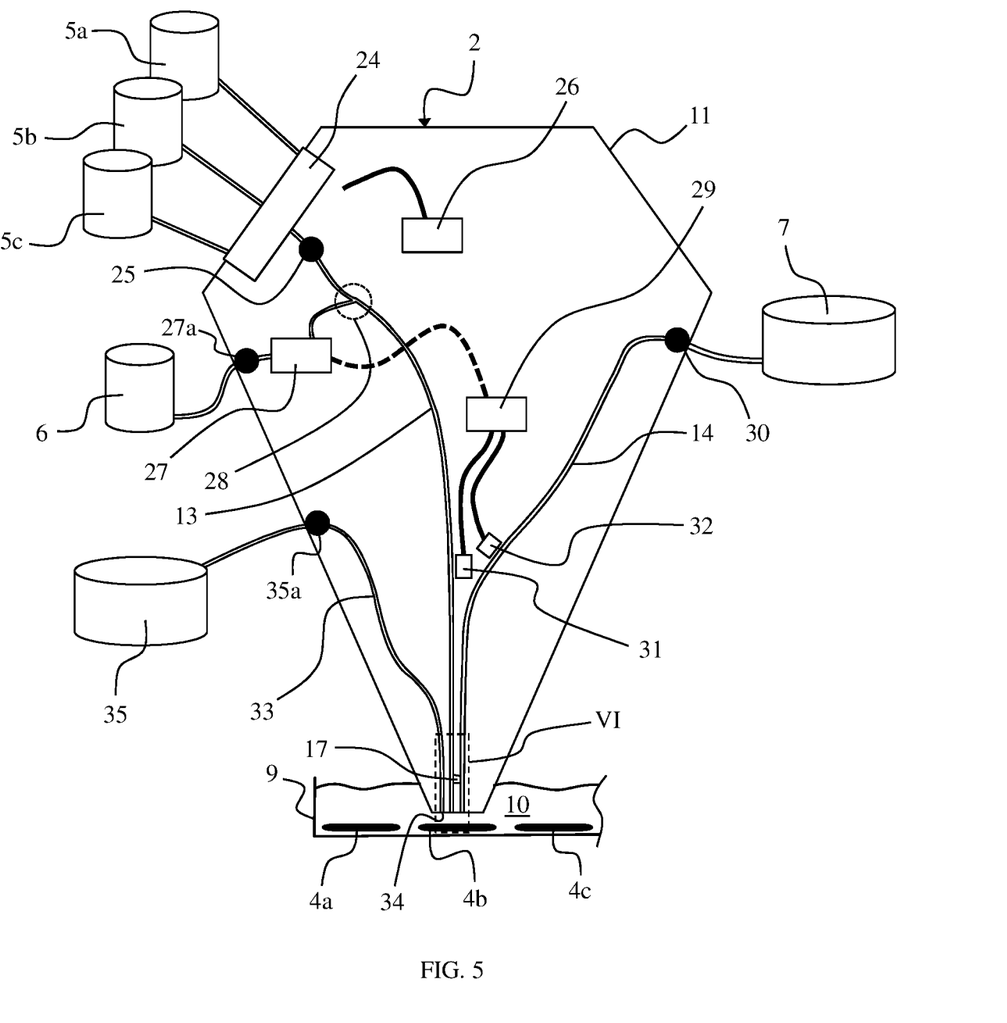
FIG. 5 shows a comprehensive view of a second embodiment of the microfluidic probe head and the fluid connections from FIG. 1.

FIG. 5 shows a schematic cross-sectional view of a second embodiment of microfluidic probe head 2 and the fluid connections from FIG. 1.

The second embodiment of microfluidic probe head 2 includes all elements of the first embodiment of FIG. 3. In addition, third fluid channel 33 is provided inside body 11, and third aperture 34 that is fluidly connected to third fluid channel 33 is formed in end face 12. Further, third fluid channel 33 is fluidly connected to additional disposal unit 35 that is capable of containing fluids via outlet 35a.

Third flow rate Q3 is applied to third fluid channel 33 such that liquids are aspirated through third aperture 34 into third fluid channel 33 using a corresponding pump (not shown), for example. The aspirated liquids are delivered via third fluid channel 33 to additional disposal unit 35. Third flow rate Q3 is preferably greater than first flow rate Q1 in order to generate and sustain laminar flow C' from first aperture 15 to third aperture 34. For example, first flow rate Q1 may be chosen to be 1.0 fL/s-1.0 mL/s. A ratio of third flow rate Q3 to first flow rate Q1 may be chosen to be 1.2-10. Third flow rate Q3 may be 1.2 fL/s-10 mL/s.

Additionally, the device is preferably configured such that a distance T1 (see FIG. 6) between first aperture 15 and second aperture 16 is greater than a distance T2 between first aperture 15 and third aperture 34, in order to favor and sustain laminar flow C' between first and third apertures 15, 34 over of a flow between first and second aperture 15, 16. In particular, distance T2 may be less than 2.0 mm. Again, achieving such a laminar flow allows for hydrodynamic flow confinement.

With confinement volume 22 located between first and third apertures 15, 34, second fluid channel 14 can mainly be used for retrieving spacers 20. The remaining part of liquid volumes 23a-23c that does not adhere to respective deposition areas 4b-4d can be retrieved via third fluid channel 33. Accordingly, retrieving spacers 20 and the remaining part of liquid volumes 23a-23c is carried out separately at different locations.

Figure 6:
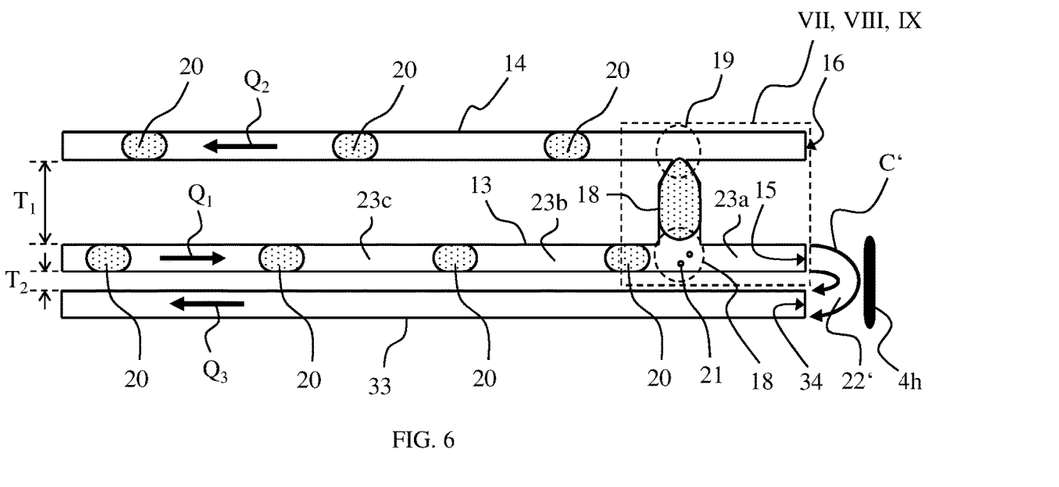
FIG. 6 illustrates an enlarged detail VI from FIG. 5.

FIG. 6 illustrates the fluid flows and the hydrodynamic flow confinement using the second embodiment of microfluidic probe head 2. Immersion liquid 10 and body 11 of microfluidic probe head 2 are not shown.

A sequence of separate liquid volumes separated by spacers 20 flows along first fluid channel 13 toward first aperture 15 with first flow rate Q1. At first bypass junction 18, spacers 20 are redirected from first fluid channel 13 via fluid bypass 17 into second fluid channel 14. At second aperture 16, immersion liquid 10 is aspirated into second fluid channel 14. Aspirated immersion liquid 10 and redirected spacers 20 are delivered to outlet 30 via second fluid channel 14.

Laminar flow C' from first aperture 15 to third aperture 34 is formed and confined by immersion liquid 10 within confinement volume 22' that extends from below first aperture 15 to below third aperture 34. Microfluidic probe head 2 is positioned such that confinement volume 36 is in a surface contact with deposition area 4.

While liquid volume 23a moves with laminar flow C' inside confinement volume 22', a part of liquid volume 23a and/or substances that are carried by liquid volumes 23 adhere to deposition area 4 and/or react with substances located on top of deposition area 4.

The operation steps of positioning microfluidic probe head 2 and depositing a part of liquid volume 23a and/or substances carried by liquid volume 23 can be repeated arbitrarily in order to deposit sequence of separate liquid volumes 23a-23c onto the respective deposition areas 4.

Figure 7:
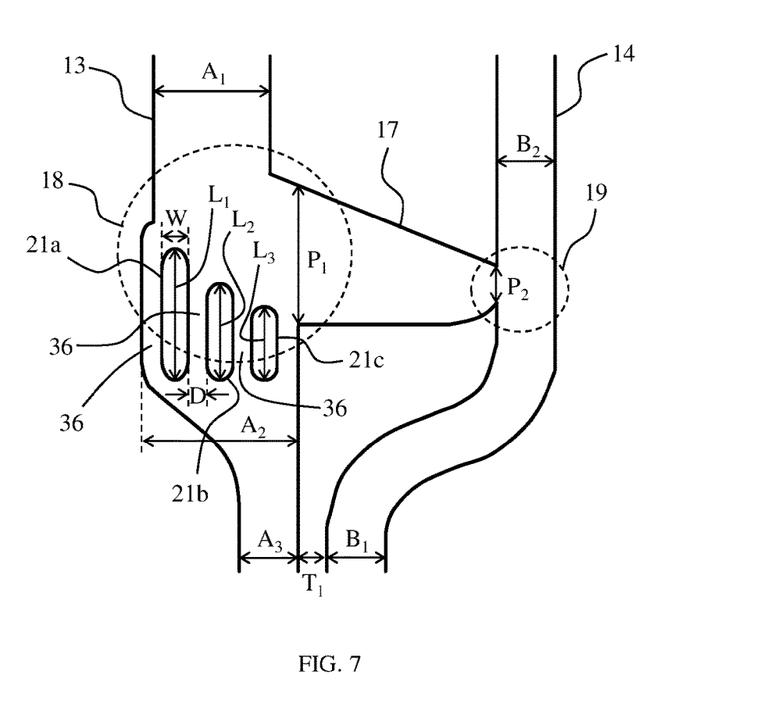
FIG. 7 shows, in an enlarged view VII from FIG. 3 or FIG. 6, a portion of a microfluidic probe head in accordance with a further embodiment.
Figure 8:
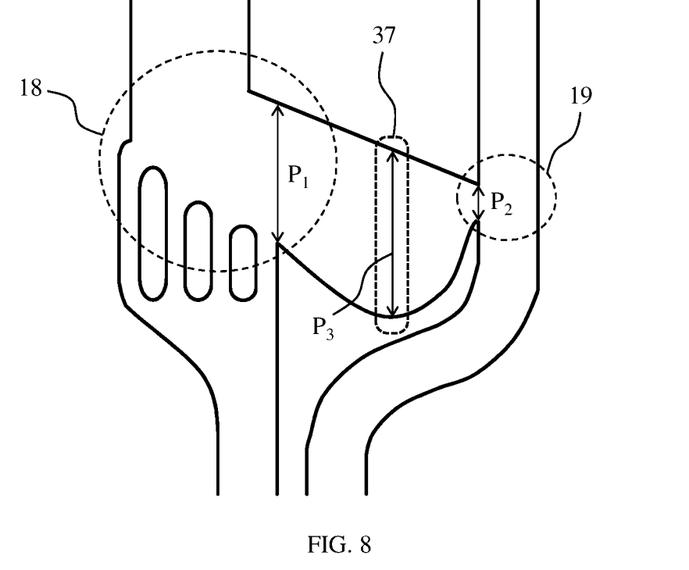
FIG. 8 shows, in an enlarged view VIII from FIG. 3 or FIG. 6, a portion of a microfluidic probe head in accordance with a further embodiment.
Figure 9:
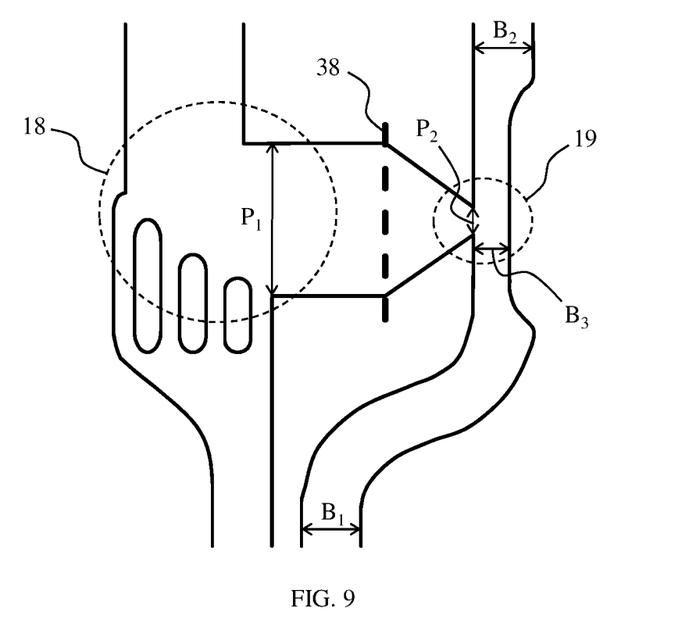
FIG. 9 shows, in an enlarged view IX from FIG. 3 or FIG. 6, a portion of a microfluidic probe head in accordance with a further embodiment.

FIGS. 7-9 show a portion of microfluidic probe head 2 in enlarged views VII, VIII, IX from FIG. 3 or FIG. 5 in accordance with three different embodiments. In particular, parts of first and second fluid channels 9, 11, blocking elements 23 and fluid bypass 18 are shown.

In all three embodiments, blocking elements 21a-21c are shaped as three bars each having a width W and different lengths L1-L3. For example, W is 5-80 µm, L1 is 120-160 µm, L2 is 80-120 µm and L3 is 40-80 µm. Sub-channels 36 are formed between two neighboring blocking elements 21 and/or an inner wall of first fluid channel 13, with a width of each subchannel 36 being the distance D between the respective blocking elements 21a-21c and/or an inner wall of first fluid channel 13. For example, D is 5-30 µm.

If a viscosity of the spacers is higher than the viscosity of liquid volumes 23a-23c, spacers 20 are redirected off a front face of blocking elements 21a-21c rather than enter sub-channels 36 due to an interfacial tension between the spacers and the liquid volumes. Consequently, blocking element 21a-21c can redirect spacers 20 from first fluid channel 13 into fluid bypass 17 while liquid volumes 23a-23c flow through sub-channels 36.

In all three embodiments, first fluid channel 13 has a diameter A1 between spacer junction 28 and first bypass junction 18. First fluid channel 13 opens up to a diameter A2 at the position of blocking elements 21. Downstream of blocking element 21 until first aperture 15, first fluid channel 13 tapers to a diameter A3 at first aperture 15. For example, A1 is 50-200 µm, A2 is 70-400 µm and A3 is 20-100 µm.

Second fluid channel 14 has a diameter B1 at second aperture 16 and a diameter B2 in the remaining part. B1 and B2 can differ or be equal. For example, both B1 and B2 are 25 µm-150 µm, respectively.

In FIG. 7, fluid bypass 17 has a width P1 at first bypass junction 18 and tapers down continuously toward second bypass junction 19 to a width P2, thereby increasing a pressure at second bypass junction 19. For example, P1 is 50-500 µm and P2 is 10-100 µm.

In FIG. 8, the width of fluid bypass 17 increases from P1 at first bypass junction 18 to P3 at plane 37, then decreases to P2 at second bypass junction 19. In this way, a greater holding capacity of fluid bypass 17 for containing spacers is provided. For example, P3 is 100-1000 µm.

In FIG. 9, the width P1 of fluid bypass 17 is constant up to plane 38 and decreases to P2 at second bypass junction 19. In addition or alternatively, second fluid channel 11 is constricted to a width B3 at second bypass junction 19 in order to increase the pressure. For example, B3 is 20-80 µm.

In all three embodiments of fluid bypass 17, the pressure at second bypass junction 19 is increased by geometry. Accordingly, spacers 20 can be inserted into second fluid channel 14 instead of leaking into it.

The suggested method and microfluidic probe involving the suggested microfluidic probe head provide possibilities of consecutive deposition of a plurality of liquid volumes separated by spacers and enables a user to effectively remove the spacers in order to prevent them from reaching the deposition area. In particular, a physical contact of the microfluidic probe and/or the microfluidic probe head with the deposition are can be avoided.

The suggested method and microfluidic probe involving the suggested microfluidic probe head could be applied to locally performing immunohistochemistry on a surface. Multiple liquids could be delivered sequentially onto immobilized cells, formalin fixed tissue sections and/or frozen tissues. In particular, sequential exposure of biological surfaces to a primary antibody, a biotin-labeled secondary antibody and/or streptavidin/HRP with intermittent buffer washing steps could be performed in order to generate a colorimetric signal that indicates the presence (or absence) of a disease marker.

The suggested method and microfluidic probe involving the suggested microfluidic probe head could be applied for surface-based immunoassays that require high efficiency in terms of space and reagent usage, in particular for batch processing in mass manufacturing. In particular, patterning different types of proteins and/or antibodies on a surface, e.g. for the research of allergic reactions, detection of viral and/or bacterial infections, could be performed by repeating operation steps of loading the microfluidic probe with one antibody solution and purging subsequently. The suggested technology could reduce a reagent usage and time requirements for these assays.

The suggested method and microfluidic probe involving the suggested microfluidic probe head could be applied for secretome analysis by delivering a sequence of chemical stimulation pulses to cells immobilized on a surface and exposing the surface to a sequence of liquid sections. The microfluidic probe could be used further for retrieving a response of the cells to the delivered stimulation.

More generally, while the present invention has been described with reference to certain embodiments, it will be understood by those skilled in the art that various changes may be made and equivalents may be substituted without departing from the scope of the present invention. In addition, many modifications may be made to adapt a particular situation to the teachings of the present invention without departing from its scope. Therefore, it is intended that the present invention not be limited to the particular embodiments disclosed, but that the present invention will include all embodiments falling within the scope of the appended claims.

What is claimed is:

1. A microfluidic probe head for processing a sequence of separate liquid volumes separated by spacers, the microfluidic probe head comprising:
   an inlet and an outlet;
   a first fluid channel and a second fluid channel;
   a fluid bypass fluidly connected to the first fluid channel at a first bypass junction and to the second fluid channel at a second bypass junction, the first bypass junction and the second bypass junction are located on opposing ends of the fluid bypass;
   a spacer insertion unit fluidly connected to the first fluid channel at a spacer junction located between the inlet and the first bypass junction, the spacer insertion configured to insert the spacers into the first fluid channel between liquid volumes in a timed fashion to provide the sequence of separate liquid volumes separated by spacers;
   a spacer control unit located inside a body of the microfluidic probe head to synchronize the insertion of the spacers into the first fluid channel by the spacer insertion unit with an aspiration rate of the spacers into the second fluid channel;
   at least one blocking element in the first bypass junction of the first fluid channel for redirecting the spacers from the first fluid channel into the fluid bypass, the at least one blocking element comprising a plurality of bars;
   a valve device fluidly connected to liquid supplies located outside the body of microfluidic probe head and fluidly connected to the first fluid channel, the valve device feeds liquid volumes received from the liquid supplies into the first fluid channel; and
   an inlet control unit located inside the body of the microfluidic probe head for fluidly connecting the inlet to one of the liquid supplies, the inlet control unit controls the valve device for feeding the liquid volumes into the first fluid channel and forming a sequence of separate liquid volumes, wherein a volume of each separate liquid volume is specified by the inlet control unit,
   wherein the first fluid channel delivers the sequence of separate liquid volumes from the inlet toward a deposition area, the fluid bypass allows the spacers to be removed from the first fluid channel obtaining a free sequence of separate liquid volumes without spacers, the first fluid channel delivers the free sequence of separate liquid volumes to the deposition area, and the second fluid channel delivers the removed spacers from the fluid bypass to the outlet.

2. The microfluidic probe head of claim 1, wherein a spacer separating two subsequent separate liquid volumes of the sequence of separate liquid volumes from each other is immiscible with the separate liquid volumes.

3. The microfluidic probe head of claim 1, wherein the second fluid channel is configured for delivering the free sequence of separate liquid volumes from the deposition area to the outlet.

4. The microfluidic probe head of claim 3, further comprising:
   a body including the first fluid channel, the second fluid channel and the fluid bypass, wherein the body has an end face configured for immersion in an immersion liquid;
   a first aperture formed in the end face and fluidly connected to the first fluid channel, wherein the fluid bypass connects to the first fluid channel upstream of where the first fluid channel connects to the first aperture; and
   a second aperture formed in the end face and fluidly connected to the second fluid channel.

5. The microfluidic probe head of claim 4, wherein a free sequence of separate liquid volumes is delivered through the first aperture and the first fluid channel at a first flow rate and aspirated together with some of the immersion liquid from the deposition area through the second aperture and the second fluid channel at a second flow rate, wherein the second flow rate is greater than the first flow rate so as to confine the delivered free sequence of separate liquid volumes within the immersion liquid, and a ratio of the second flow rate to the first flow rate corresponds to a laminar flow from the first aperture to the second aperture.

6. The microfluidic probe head of claim 1, further comprising:
   an additional outlet; and
   a third fluid channel configured for delivering the free sequence of separate liquid volumes from the deposition area to the additional outlet.

7. The microfluidic probe head of claim 6, further comprising:
   a body including the first fluid channel, the second fluid channel, the third fluid channel and the fluid bypass, the body having an end face configured for immersion in an immersion liquid;
   a first aperture formed in the end face and fluidly connected to the first fluid channel, wherein the fluid bypass connects to the first fluid channel upstream of where the first fluid channel connects to the first aperture;
   a second aperture formed in the end face and fluidly connected to the second fluid channel;
   a third aperture formed in the end face and fluidly connected to the third fluid channel.

8. The microfluidic probe head of claim 7, wherein a free sequence of separate liquid volumes is provided through the first aperture and the first fluid channel, some aspirated immersion liquid from the deposition area is provided through the second aperture and the second fluid channel, and the free sequence of separate liquid volumes together is aspirated with some of the immersion liquid from the deposition area through the third aperture and the third fluid channel.

9. The microfluidic probe head of claim 1, wherein the fluid bypass has a first width at the first bypass junction and a second width at the second bypass junction, and the at least one blocking element is adjacent to a lowermost part of the first width.

10. The microfluidic probe head of claim 1, wherein the fluid bypass tapers down from the first fluid channel toward the second fluid channel.

11. The microfluidic probe head of claim 1, wherein the second fluid channel includes a constriction configured for increasing a pressure at a location where the fluid bypass connects fluidly to the second fluid channel.

12. The microfluidic probe head of claim 1, further comprising:
   a spacer supply located outside of the body of the microfluidic probe head fluidly connected to the spacer insertion unit via the inlet, the spacer supply supplies the spacer insertion unit with the spacers, the spacers comprising a non-polar fluid that is immiscible with any of the liquid volumes and an immersion liquid causing the liquid volumes to be separated from one another by the spacers.

13. The microfluidic probe head of claim 1, wherein the sequence includes separated volumes of at least one liquid that contains a biochemical substance.

14. The microfluidic probe head of claim 1, wherein the plurality of bars are contiguously positioned in a decreasing order of length comprising:
   a first bar having a first length;
   a second bar having a second length; and
   a third bar having a third length, wherein the first length is greater than the second length, and the second length is greater than the third length,
   wherein the first bar, the second bar, and the third bar have equal widths w and are separated by a distance D.

15. The microfluidic probe head of claim 14, further comprising:
   at least one sub-channel located between two neighboring bars of the plurality of bars and between an inner wall of the first fluid channel and a bar of the plurality of bars, wherein a viscosity of a spacer separating two liquid volumes is higher than a viscosity of each of the separated liquid volumes, and
   wherein an interfacial tension between the spacer and the two liquid volumes causes the spacers to be redirected off a front face of the plurality of bars rather than entering the sub-channels.

16. The microfluidic probe head of claim 1, further comprising:
   a first detector located in a vicinity of the first fluid channel; and
   a second detector located in a vicinity of the second fluid channel, the first detector and the second detector connected to the spacer control unit,
   wherein the first and the second detectors detect and identify each spacer, and generate a first detection signal and a second detection signal, respectively, that is transmitted to the spacer control unit.

17. The microfluidic probe head of claim 16, wherein based on the first detection signal and the second detection signal the spacer control unit synchronizes the insertion rate of the spacers into the first fluid channel and the aspiration rate at which they are aspirated through the second fluid channel.

* * * * *